US011350386B2

(12) United States Patent  
Kikuma et al.

(10) Patent No.: US 11,350,386 B2  
(45) Date of Patent: May 31, 2022

(54) POINT-TO-POINT RADIO APPARATUS, MOBILE BACKHAUL SYSTEM, AND COMMUNICATION CONTROL METHOD

(71) Applicant: NEC Corporation, Tokyo (JP)

(72) Inventors: Tomohiro Kikuma, Tokyo (JP); Hiroaki Miyamoto, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/018,053

(22) Filed: Sep. 11, 2020

(65) Prior Publication Data  
US 2020/0413375 A1 Dec. 31, 2020

Related U.S. Application Data

(63) Continuation of application No. 16/150,924, filed on Oct. 3, 2018, now Pat. No. 10,798,681, which is a (Continued)

(30) Foreign Application Priority Data

Mar. 18, 2014 (JP) ................................. 2014-054547

(51) Int. Cl.  
*H04W 72/02* (2009.01)  
*H04W 76/14* (2018.01)  
(Continued)

(52) U.S. Cl.  
CPC ........... *H04W 72/02* (2013.01); *H04L 5/0096* (2013.01); *H04L 5/14* (2013.01); *H04W 16/26* (2013.01);  
(Continued)

(58) Field of Classification Search  
CPC ..... H04W 72/02; H04W 16/26; H04W 24/04; H04W 74/002; H04W 76/14;  
(Continued)

(56) References Cited

U.S. PATENT DOCUMENTS 6,498,844 B1 * 12/2002 Stademann .............. H04Q 3/66  
379/221.02  
8,502,733 B1 * 8/2013 Negus ................. H04W 72/048  
342/359  
(Continued)

FOREIGN PATENT DOCUMENTS

EP 1545037 B1 1/2007  
JP 2011-205638 A 10/2011  
(Continued)

OTHER PUBLICATIONS

Extended European Search Report issued by the European Patent Office for European Application No. 15765382.5 dated Oct. 6, 2017 (9 pages).  
(Continued)

*Primary Examiner* — Wutchung Chu

(57) ABSTRACT

A point-to-point radio apparatus (10A or 10B) is configured to perform a first channel search (S12) to search for an idle channel available to use in a first point-to-point radio link (11A) in response to receiving a first notification (S11) indicating that a second point-to-point radio link (11E) operated by another point-to-point radio system (1E) is unavailable. This contributes to, for example, efficient channel searches in point-to-point radio systems.

10 Claims, 6 Drawing Sheets

Related U.S. Application Data continuation of application No. 15/121,473, filed as application No. PCT/JP2015/000736 on Feb. 18, 2015, now Pat. No. 10,123,305.

(51) Int. Cl.
| | | |
|---|---|---|
| *H04W 16/26* | (2009.01) | |
| *H04W 24/04* | (2009.01) | |
| *H04L 5/14* | (2006.01) | |
| *H04L 5/00* | (2006.01) | |
| *H04W 74/00* | (2009.01) | |
| *H04W 92/12* | (2009.01) | |

(52) U.S. Cl.
CPC ......... *H04W 24/04* (2013.01); *H04W 74/002* (2013.01); *H04W 76/14* (2018.02); *H04L 5/1461* (2013.01); *H04W 92/12* (2013.01)

(58) Field of Classification Search
CPC ... H04W 92/12; H04W 36/305; H04W 76/18; H04W 76/19; H04W 84/047; H04W 36/0079; H04W 36/00837; H04W 36/0055; H04W 40/12; H04W 24/02; H04W 24/00; H04W 24/10; H04W 48/16; H04W 40/02; H04W 36/30; H04W 28/08; H04W 76/25; H04W 76/15; H04W 40/22; H04W 36/08; H04W 16/28; H04W 72/042; H04W 24/08; H04L 5/0096; H04L 5/14; H04L 5/1461; H04L 45/22; H04L 45/28; H04L 1/0076; H04L 41/0668; H04L 41/0654; H04B 7/088; H04B 7/0695; H04B 7/15542; H04B 7/0617; H04B 7/024

See application file for complete search history.

(56) References Cited

U.S. PATENT DOCUMENTS

| | | | | |
|---|---|---|---|---|
| 8,824,311 | B2* | 9/2014 | Beaudin | H04W 72/082 |
| | | | | 370/254 |
| 8,989,762 | B1* | 3/2015 | Negus | H04B 1/711 |
| | | | | 455/454 |
| 2007/0217373 | A1* | 9/2007 | Kotzin | H04L 1/0631 |
| | | | | 370/338 |
| 2007/0218910 | A1* | 9/2007 | Hill | H04W 92/12 |
| | | | | 455/445 |
| 2009/0029645 | A1 | 1/2009 | Leroudier | |
| 2009/0129273 | A1* | 5/2009 | Zou | H04L 45/70 |
| | | | | 370/235 |
| 2009/0310514 | A1 | 12/2009 | Jeon et al. | |
| 2011/0244852 | A1 | 10/2011 | Quadri et al. | |
| 2011/0286424 | A1 | 11/2011 | Jeon et al. | |
| 2011/0317544 | A1* | 12/2011 | Chou | H04L 41/0681 |
| | | | | 370/242 |
| 2012/0002537 | A1* | 1/2012 | Bao | H04W 24/04 |
| | | | | 370/221 |
| 2012/0063383 | A1* | 3/2012 | Barbieri | H04W 72/082 |
| | | | | 370/329 |
| 2012/0120892 | A1 | 5/2012 | Freda et al. | |
| 2012/0224472 | A1* | 9/2012 | Kim | H04W 24/04 |
| | | | | 370/315 |
| 2012/0314567 | A1* | 12/2012 | Seo | H04W 24/04 |
| | | | | 370/228 |
| 2013/0003534 | A1* | 1/2013 | Henry | H04L 45/28 |
| | | | | 370/228 |
| 2013/0208669 | A1* | 8/2013 | Pan | H04W 72/044 |
| | | | | 370/329 |
| 2014/0185434 | A1* | 7/2014 | Kim | H04L 41/0668 |
| | | | | 370/228 |
| 2014/0185497 | A1* | 7/2014 | Wolf | H04W 28/26 |
| | | | | 370/294 |
| 2014/0187236 | A1* | 7/2014 | Chiang | H04W 24/04 |
| | | | | 455/423 |
| 2014/0241187 | A1 | 8/2014 | Barkay et al. | |
| 2015/0257024 | A1* | 9/2015 | Baid | H04W 24/08 |
| | | | | 370/338 |
| 2020/0162316 | A1* | 5/2020 | Rengarajan | H04L 41/142 |

FOREIGN PATENT DOCUMENTS

| | | |
|---|---|---|
| JP | 2011-244186 A | 12/2011 |
| JP | 2013-021648 A | 1/2013 |
| JP | 2013-102361 A | 5/2013 |
| WO | WO-2008/026868 A2 | 3/2008 |
| WO | WO-2009/014764 A1 | 1/2009 |
| WO | WO-2013/162492 A1 | 10/2013 |
| WO | WO-2014043665 A3 * | 7/2014 ............ H04W 24/08 |

OTHER PUBLICATIONS

International Search Report corresponding to PCT/JP2015/000736, dated May 19, 2015, 2 pages.

* cited by examiner

POINT-TO-POINT RADIO APPARATUS, MOBILE BACKHAUL SYSTEM, AND COMMUNICATION CONTROL METHOD

CROSS-REFERENCE TO RELATED APPLICATIONS

This present application is a continuation patent application of U.S. patent application Ser. No. 16/150,924, filed on Oct. 3, 2018, which is a continuation patent application of U.S. patent application Ser. No. 15/121,473 filed on Aug. 25, 2016, now U.S. Pat. No. 10,123,305, which is a U.S. a national stage application of International Application No. PCT/JP2015/000736 entitled "POINT-TO-POINT RADIO APPARATUS, MOBILE BACKHAUL SYSTEM, AND COMMUNICATION CONTROL METHOD," filed on Feb. 18, 2015, which claims the benefit of the priority of Japanese Patent Application No. 2014-054547 filed on Mar. 18, 2014, the disclosures of each of which are hereby incorporated by reference in their entirety.

TECHNICAL FIELD

The disclosure of this specification relates to a channel search in a point-to-point radio system.

BACKGROUND ART

Point-to-point radio systems using microwaves, millimeter waves or the like are known (see, for example, Patent Literature 1 and 2). In a point-to-point radio system, two communication apparatuses perform digital communication via a point-to-point radio link. To be more specific, each of the communication apparatuses is equipped with a directional antenna to communicate with a counterpart apparatus by means of a point-to-point radio technology and forms a directional beam toward the counterpart apparatus. The point-to-point radio link is thus established between the two communication apparatuses. In this specification, each of the two communication apparatuses constituting the point-to-point radio system, i.e., a communication apparatus that communicates with a counterpart apparatus using the point-to-point radio technology is referred to as a point-to-point radio apparatus.

Point-to-point radio systems are used in, for example, a mobile backhaul. The mobile backhaul includes both a network that connects a base station in a cellular communication system to a site where a higher network node is installed and a network that connects between base stations. Each base station is, for example, a Base Transceiver Station (BTS), a NodeB, or an eNodeB. The higher network node is, for example, a Base Station Controller (BSC), a Radio Network Controller (RNC), a Serving General Packet Radio Service Support Node (SGSN), a Serving Gateway (S-GW), or a Mobility Management Entity (MME). Advantages of point-to-point radio systems over wired connections with optical fibers are, for example, easy network construction, high economic efficiency, and fewer restrictions on installation locations of base stations.

Point-to-point radio systems commonly support simultaneous bidirectional communication (full-duplex communication). Accordingly, a point-to-point radio link includes a bidirectional pair of radio links. In this specification, one of the bidirectional pair of radio links is referred to as a forward link, while the other one is referred to as a reverse link. Further, when a point-to-point radio system is used in a mobile backhaul, a radio link in a direction from a higher network node toward a base station is defined to as a forward link, while a radio link in a direction from a base station to a higher network node is defined as a reverse link.

In one example, a point-to-point radio system uses Frequency Division Duplexing (FDD) or Time Division Duplex (TDD) to perform simultaneous bidirectional communication (full-duplex communication). In the case of FDD, two different radio channels are used for the bidirectional pair of radio links. In the case of TDD, one radio channel is used for the pair of radio links in a time-sharing manner. Each radio channel may be referred to as a radio frequency carrier.

CITATION LIST

Patent Literature

Patent Literature 1: European Patent No. 1545037
Patent literature 2: Japanese Unexamined Patent Application Publication No. 2011-244186

SUMMARY OF INVENTION

Technical Problem

The present inventors have examined a procedure for switching an operating radio channel of a point-to-point radio link in a mobile backhaul in which a plurality of point-to-point radio systems is disposed in a communication path between a base station and a higher network node. When a failure occurs in a point-to-point radio link (e.g., deterioration in reception quality due to interference or disconnection of the radio link), and the radio link is no longer capable of successful reception, the point-to-point radio system needs to switch a radio channel (or carrier) that has been used in the radio link, in which the failure occurred, to another radio channel (or carrier). In order to switch the operating radio channel, in most cases, it is necessary to search for an unused radio channel (i.e., a clear channel or an unoccupied channel) that can achieve favorable reception quality in the radio link. A search for an unused radio channel is referred to as a channel search, a channel scan, a channel selection, a channel assessment, or the like.

The channel search may be performed prior to a failure occurrence. For example, the point-to-point radio apparatuses may perform the channel search during a downtime scheduled by an operator. In any case, as a service (i.e., communication on a point-to-point radio link) needs to be temporarily stopped in order to perform the channel search, it should be noted that opportunities for the channel search are limited.

When one of the point-to-point radio systems disposed in the communication path between the base station and the higher network node performs the channel search, the communication path is considered to become temporarily unavailable. In particular, it is considered that other point-to-point radio systems disposed on the downstream side (closer to the base station) of the point-to-point radio system that performs the channel search temporarily lose the path to the higher network. Therefore, in an example, when a point-to-point radio system disposed upstream closer to the higher network node performs the channel search, it may be efficient if another point-to-point radio system disposed downstream of the system that performs the channel search also performs the channel search.

In view of the above, one object achieved by embodiments disclosed in this specification is to provide a point-to-point radio apparatus, a mobile backhaul system, a communication control method, and a program that contribute to efficient channel searches. It should be noted that this object is one of the objects to be achieved by embodiments disclosed in this specification. Other objects or problems and novel features will be made apparent from the following description and the accompanying drawings.

Solution to Problem

In an aspect, a point-to-point radio apparatus includes a radio interface, a communication interface, a signal processing unit, and a control unit. The radio interface is configured to establish a first point-to-point radio link with a counterpart apparatus and to communicate with the counterpart apparatus using the first point-to-point radio link. The signal processing unit is configured to relay traffic between the radio interface and the communication interface. The control unit is configured to perform a first channel search to search for an idle channel available to use in the first point-to-point radio link in response to receiving a first notification indicating that a second point-to-point radio link operated by the other point-to-point radio system is unavailable.

In an aspect, a mobile backhaul system includes first and second point-to-point radio systems configured to operate first and second point-to-point radio links, respectively. Both the first and second point-to-point radio systems are disposed in a communication path between a base station and a higher network node and are used to communicatively connect the base station to the higher network node. The first point-to-point radio system is disposed downstream of the communication path and is closer to the base station than the second point-to-point radio system is to the base station. On the other hand, the second point-to-point radio system is disposed upstream of the communication path and is closer to the higher network node than the first point-to-point radio system is to the higher network node. Further, the first point-to-point radio system is configured to perform a first channel search to search for an idle channel available to use in the first point-to-point radio link when a second channel search to search for an idle channel available to use in the second point-to-point radio link is performed.

In an aspect, a communication control method performed by a point-to-point radio apparatus includes performing a first channel search to search for an idle channel available to use in a first point-to-point radio link operated by the point-to-point radio apparatus in response to receiving a first notification indicating that a second point-to-point radio link operated by another point-to-point radio system is unavailable.

In an aspect, a program contains a set of instructions software codes) which, when loaded into a computer, causes a computer to perform the aforementioned communication control method.

Advantageous Effects of Invention

According to the above aspects, it is possible to provide a point-to-point radio apparatus, a mobile backhaul system, a communication control method, and a program that contribute to efficient channel searches.

DESCRIPTION OF EMBODIMENTS

Figure 1:
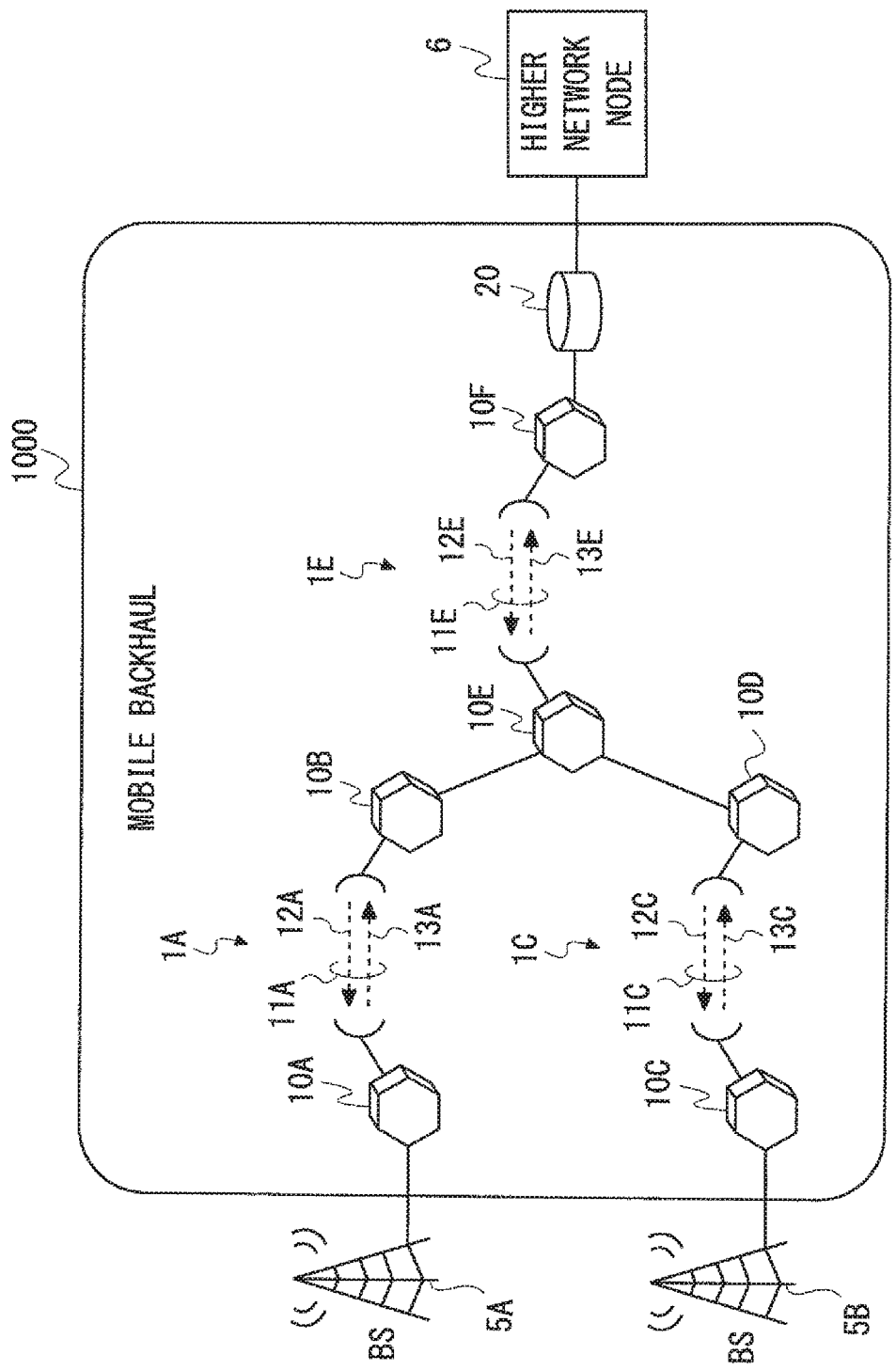
FIG. 1 is a diagram showing a configuration example of a mobile backhaul according to a first embodiment.

Hereinafter, specific embodiments will be described in detail with reference to the drawings. Note that in the drawings, the same or corresponding elements are denoted by the same reference signs, and their repeated explanations will be omitted as needed for the sake of clarity.

First Embodiment

FIG. 1 shows a configuration example of a mobile backhaul 1000 according to this embodiment. The mobile backhaul 1000 is a network that connects a base station(s) 5 to a higher network node 6. The mobile backhaul 1000 includes a plurality of point-to-point radio systems 1. Each base station 5 is, for example, a BTS in Global System for Mobile Communications (GSM (registered trademark)) and CDMA2000, a NodeB in Universal Mobile Telecommunications System (UMTS), or an eNodeB in Long Term Evolution (LTE). The higher network node 6 may be an entity in a Radio Access Network (RAN) or an entity in a core network. The higher network node 6 is a BSC, an RNC, an SGSN, an S-GW, or an MME. In the configuration example of FIG. 1, the mobile backhaul 1000 includes three point-to-point radio systems 1A, 1C, and 1E in order to connect two base stations 5A and 5B to the higher network node 6.

The point-to-point radio system 1A is composed of a pair of point-to-point radio apparatuses 10A and 10B. The radio apparatuses 10A and 10B are configured to establish a point-to-point radio link 11A using, for example, microwaves or millimeter waves and communicate with each other via the point-to-point radio link 11A. The point-to-point radio link 11A includes a bidirectional pair of radio links, namely, a forward link 12A and a reverse link 13A.

The point-to-point radio system 1C is composed of a pair of point-to-point radio apparatuses 10C and 10D. The radio apparatuses 10C and 10D communicate with each other via a point-to-point radio link 11C. The point-to-point radio link 11C includes a forward link 12C and a reverse link 13C.

The point-to-point radio system 1E is composed of a pair of point-to-point radio apparatuses 10E and 10F. The radio apparatuses 10E and 10F communicate with each other via a point-to-point radio link 11E. The point-to-point radio link 11E includes a forward link 12E and a reverse link 13E.

Each of the radio apparatuses 10A to 10F includes one or more communication interfaces (communication ports) in addition to a radio interface (radio port), Each communication interface handles packet traffic, time division multiplexed (TDM) traffic, Asynchronous Transfer Mode (ATM) traffic, or frame relay traffic. The communication interface for packet traffic is, for example, a Local Area Network (LAN) interface that can be connected to a LAN conforming to IEEE 802.3 series. Further, the communication interface for TDM traffic is, for example, a T1/E1 interface or a Synchronous Optical Network (SONET)/Synchronous Digital Hierarchy (SDH) interface. TDM traffic, ATM traffic, and frame relay traffic may be transferred over a packet switched network using the pseudo-wire technology.

Moreover, each of the radio apparatuses 10A to 10F includes a signal processing unit that relays traffic between the one or more communication interfaces and the radio interface. The signal processing unit may be a multiplexer that multiplexes, in a fixed manner, layer-2 Protocol Data Units (PDUs) or layer-3 PDUs received by the one or more communication interfaces. Alternatively, the signal processing unit may be a layer-2 switch or a layer-3 switch. The signal processing unit as a layer-2 or layer-3 switch performs forwarding/routing based on address information contained in a header of a layer-2 PDU or a layer-3 PDU. A typical layer-2 PDU is a Media Access Control (MAC) frame, and a typical layer-3 PDU is an Internet Protocol (IP) packet. However, the signal processing units in the radio apparatuses 10 may handle other layer-2 PDUs or layer-3 PDUs. For example, the signal processing units in the radio apparatuses 10 may perform forwarding of MPLS-labeled packets based on Multi-Protocol Label Switching (MPLS).

The configuration example of the mobile backhaul 1000 shown in FIG. 1 is described in more detail below. The point-to-point radio systems 1A and 1E are disposed on the communication path between the base station 5A and the higher network node 6 and used to communicatively connect the base station 5A to the higher network node 6. Further, the point-to-point radio systems 1C and 1E are disposed on the communication path between the base station 59 and the higher network node 6 and used to communicatively connect the base station 5B to the higher network node 6. That is, the upstream point-to-point radio system 1E is coupled to two downstream point-to-point radio systems 1A and 1B and accordingly aggregates and transfers the traffic regarding both the base stations 5A and 5B.

A packet communication device 20 relays data packets (e.g., layer-2 Protocol Data Units (PDUs) or layer-3 PDUs) between the base stations 5A and 5B and the higher network node 6, The packet communication device 20 may be a layer-2 switch or a layer-3 switch. Alternatively, the packet communication device 20 may be a label switch router (LSR) that forwards MPLS-labeled packets based on Multi-Protocol Label Switching (MPLS).

The communication interface (e.g., LAN interface) of the point-to-point radio apparatus 10B can communicate with the communication interfaces (e.g., LAN interfaces) of the point-to-point radio apparatuses 10D and 10E. For example, the point-to-point radio apparatuses 10B, 10D, and 10E are disposed at the same site.

Note that the configuration example in FIG. 1 is merely an example. In the configuration example of FIG. 1, the packet communication device 20 may be omitted. The packet communication device 20 is effective when the base stations 5A and 5B are aggregated, and when a direct communication interface is provided between the base stations 5A and 5B without being routed through the higher network node 6. A simplest configuration example of the mobile backhaul 1000 does not include the packet communication device 20. However, additional packet communication device may be disposed between the base station 5A and the radio apparatus 10A. Likewise, additional packet communication device may be disposed between the base station 5B and the radio apparatus 10C. Further, additional pieces of packet communication device may be disposed between the radio apparatuses 10B, 10D, and 10E.

Hereinafter, a channel search operation performed by the point-to-point radio system 1A according to this embodiment is described. The downstream point-to-point radio system 1A is configured to perform a channel search for its own point-to-point radio link 11A (i.e., the forward link 12A, or the reverse link 13A, or both) when the upstream point-to-point radio system 1E performs a channel search for the point-to-point radio link 11E (i.e., the forward link 12E, or the reverse link 13E, or both).

Then the upstream point-to-point radio system 1E performs the channel search for the radio link 11E, the downstream point-to-point radio system 1A temporarily loses the communication path to the higher network node 6. Accordingly, the period in which the channel search is performed in the upstream radio link 11E can be regarded as being a period that tends to allow a disconnection of the downstream radio link 11A. This is because the disconnection of the radio link 11E disables the communication between the base station 5A and the higher network node 6. In view of this point, in this embodiment, when the upstream point-to-point radio system 1E is performing the channel search, the downstream point-to-point radio system 1A also performs the channel search together with the upstream point-to-point radio system 1E. It is thus possible to efficiently perform the channel search in this embodiment.

For example, the radio apparatus 10A or 10B or both may start the channel search for their own point-to-point radio link 11A (i.e., the forward link 12A, or the reverse link 13A, or both) in response to receiving a notification that explicitly or implicitly indicates that the upstream point-to-point radio link 11E (i.e., the forward link 12E, or the reverse link 13E, or both) is unavailable. The notification may explicitly or implicitly indicate that the channel search for the upstream point-to-point radio link 11E is performed.

The notification may be a control message sent from the point-to-point radio system 1E (e.g., the radio apparatus 10E) when the channel search is performed for the upstream point-to-point radio link 11E. The control message may be a request by the upstream point-to-point radio system 1E to the downstream point-to-point radio system 1A to perform the channel search.

Alternatively, the notification may be detected as a link-down in the communication interface that is caused by unavailability of the upstream point-to-point radio link 11E. To be more specific, the radio apparatus 1E may stop an output from the communication interface (e.g., LAN interface) for communicating with the radio apparatuses 10B and 10C when the radio link 11E (i.e., the forward link 12E, or the reverse link 13E, or both) is unavailable. This enables the radio apparatus 10B to detect a link-down in its own communication interface (e.g., LAN interface) and to start the channel search in its own radio link 11A in response to the detection of the link-down.

Further alternatively, the notification may be sent from the upstream point-to-point radio system 1E to the downstream point-to-point radio system 1A via an Operation and Maintenance (OAM) system (not shown in the diagram).

The channel search by the point-to-point radio system 1A may be performed only for a unidirectional link (i.e., the link 12A or 13A) or may be performed for both of the bidirectional pair of links (i.e., the links 12A and 13A). The channel search by the point-to-point radio system 1E is performed in a manner similar to the channel search by the point-to-point radio system 1A.

Events that trigger the channel search by the upstream point-to-point radio system 1E are not particularly limited. For example, the point-to-point radio system 1E may start the channel search for the radio link 11E in response to detecting deterioration in reception quality of the radio link 11E that is caused by interference or a disconnection of the radio link 11E due to some reasons. Alternatively, the point-to-point radio system 1E may start the channel search for the radio link 11E according to an instruction by an operator or a predetermined schedule.

A result of the channel search by the point-to-point radio system 1A may be used as follows. In an example, when reception quality of an idle radio channel obtained by the channel search is better than reception quality of the operating radio channel that is currently used in the radio link 11A, the point-to-point radio system 1A may change the operating radio channel to the idle radio channel obtained by the channel search. In another example, the point-to-point radio system 1A may hold the result of the channel search and use the result of the channel search that has been held in order to select a new operating radio channel when a failure occurs in the radio link 11A in the future. In still another example, the point-to-point radio system 1A may send the result of the channel search to the OAM system (not shown in the diagram).

Although the above descriptions mainly focused on the operation of the point-to-point radio system 1A, the other downstream point-to-point radio system 1C may operate in a manner similar to the point-to-point radio system 1A.

Figure 2:
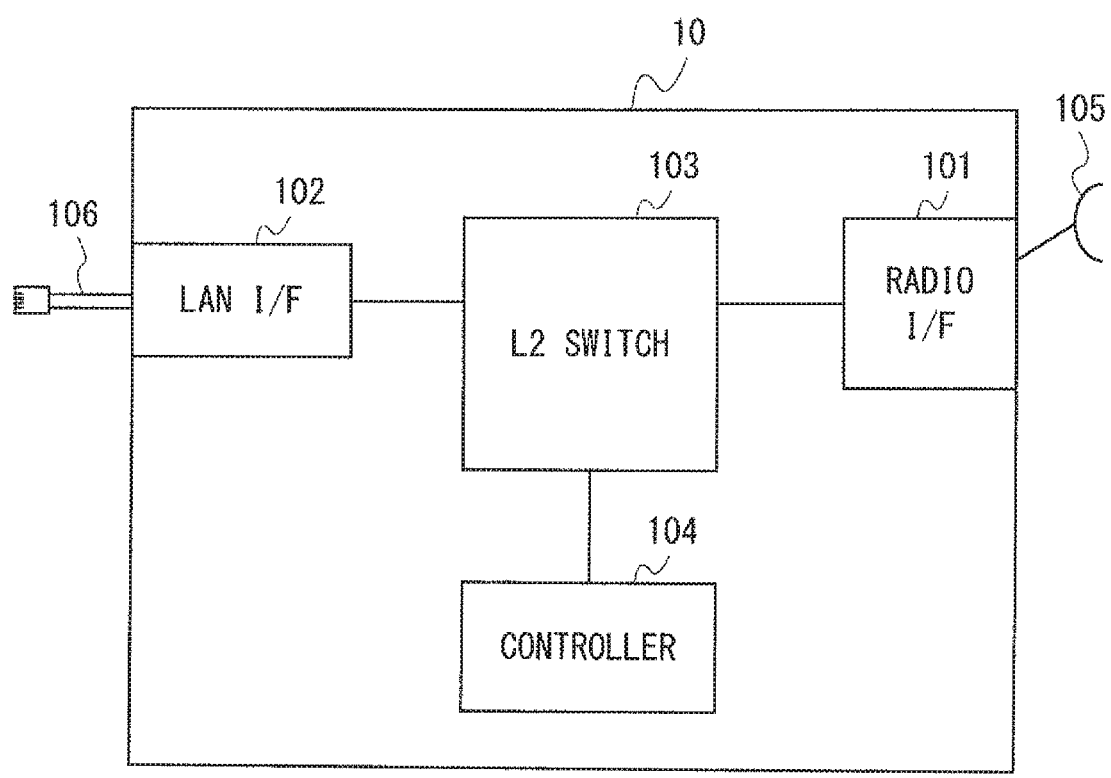
FIG. 2 is a block diagram showing a configuration example of a point-to-point radio apparatus according to the first embodiment.

Hereinafter, a configuration example of the point-to-point radio apparatus 10 according to this embodiment will be described. FIG. 2 is a block diagram showing a configuration example of the radio apparatus 10. A radio interface (radio port) 101 is connected to an antenna 105 and performs point-to-point radio transmission with a counterpart radio apparatus. The radio apparatus 10 shown in FIG. 2 includes at least one LAN interface (LAN port) 102. The LAN interface 102 may support a wired LAN or may support a wireless LAN. If the LAN interface 102 supports a wired LAN, a LAN cable 106 such as a twisted pair cable or an optical fiber cable is connected to the LAN interface 102.

The radio apparatus 10 shown in FIG. 2 includes a layer-2 switch unit 103. The layer-2 switch unit 103 transfers layer-2 PDUs between at least one LAN interface 102 and the radio interface 101. As has already been mentioned, the layer-2 switch unit 103 is merely an example of the signal processing unit included in the radio apparatus 10. For example, the radio apparatus 10 may include a multiplexer or a layer-3 switch in place of the layer-2 switch unit 103.

The controller 104 is configured to perform the channel search to search for an idle radio channel available to use in the point-to-point radio link operated by the controller 104 in response to receiving a notification explicitly or implicitly indicating that a point-to-point radio link 11 operated by another point-to-point radio system 1 (i.e., an upstream point-to-point radio system) is unavailable.

Figure 3:
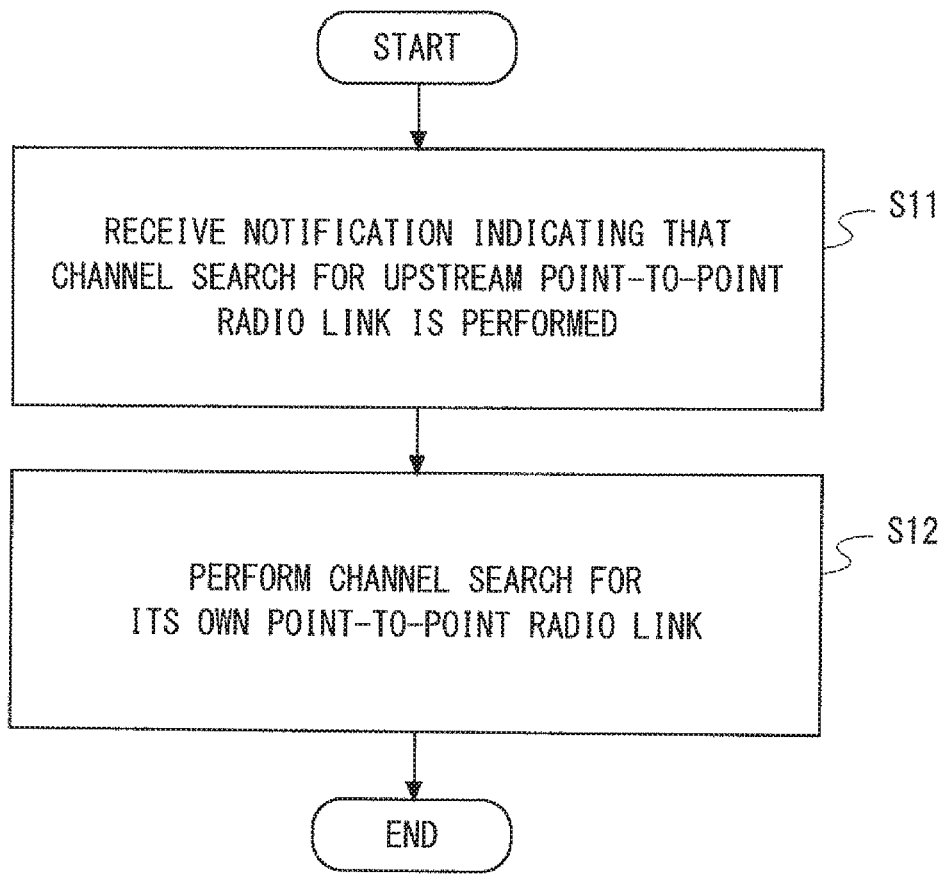
FIG. 3 is a flowchart showing an example of an execution procedure of a channel search by the point-to-point radio apparatus according to the first embodiment.

FIG. 3 is a flowchart showing a control procedure performed by the controller 104. In the step S11, the controller 104 receives a notification indicating that a channel search for an upstream point-to-point radio link is performed. In response to receiving the notification, the controller 104 performs the channel search for its own point-to-point radio link in the step S12.

Figure 4:
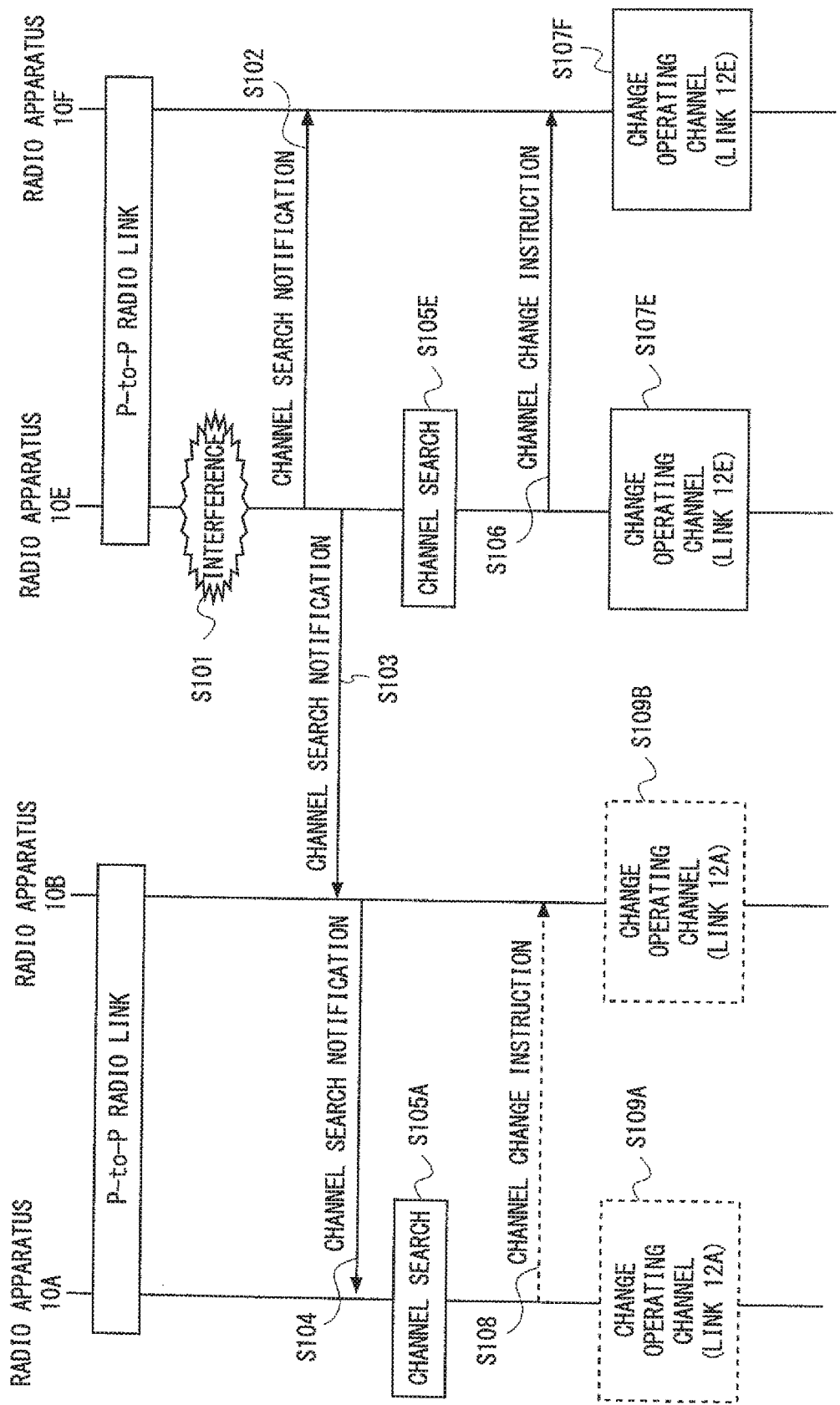
FIG. 4 is a sequence diagram showing an example of the execution procedure of channel searches in the mobile backhaul according to the first embodiment.

FIG. 4 is a sequence diagram showing an example of a control procedure including the channel searches and change of the operating radio channels in the mobile backhaul 1000. In the step S101, the point-to-point radio apparatus 10E detects deterioration in the reception quality of the forward link 12E. The procedure for changing the operating radio channel is performed typically in order to avoid interference on a specific radio channel from another radio system. Accordingly, the reception quality monitored in the step S101 to trigger the procedure for changing the operating radio channel may typically be a Signal to Interference plus Noise Ratio (SINR). In addition to the SINR, a Received Signal Strength Indicator (RSSI) may be used to distinguish the interference situation from other situations in which the line of sight in the forward link 12E is degraded due to deterioration in weather conditions or blocking by any obstacles.

In the step S102, in response to detection of the deterioration in the reception quality of the forward link 12E, the radio apparatus 10E sends a predetermined notification to the radio apparatus 10F using the current operating radio channel of the reverse link 13E. The predetermined notification in the step S102 may indicate, for example, that the radio apparatus 10E will perform the channel search for the forward link 12E (a channel-search notification). In place of or in combination with this, the predetermined notification in the step S102 may indicate that a failure is detected in the forward link 12E or may indicate a request to the radio apparatus 10F to perform the channel search in the reverse link 13E.

In the step S103, the radio apparatus 10E sends a predetermined notification to the radio apparatus 10B that constitutes the downstream point-to-point radio system 1A. In a manner similar to the notification in the step S102, the predetermined notification in the step S103 may indicate that the channel search for the forward link 12E is executed (a channel-search notification). In place of or in combination with this, the predetermined notification in the step S103 may indicate that a failure is detected in the forward link 12E or may indicate a request to execute the channel search for the downstream point-to-point radio link 11A. In response to receiving the notification in the step S103, the radio apparatus 10B sends a channel-search notification to the radio apparatus 10A to cause the radio apparatus 10A to start the channel search for the forward link 12A (step S104).

In the step S105A, the radio apparatus 10A executes the channel search for the forward link 12A. Likewise, in the step S105E, the radio apparatus 10E executes the channel search for the forward link 12E. Note that the channel search in the step S105A is not necessarily performed in complete synchronization with the channel search in the step S105E. The channel search in the step S105A is preferably performed during a downtime of the forward link 12E in which the channel search in the step S105E is performed.

In the step S106, the radio apparatus 10E determines a new radio channel to be used as the operating radio channel of the forward link 12E based on a result of the channel search in the step S105E. Then, the radio apparatus 10E sends a channel change instruction to the radio apparatus 10F using the reverse link 13E. The channel change instruction indicates a new operating radio channel of the forward link 12E determined by the radio apparatus 10E.

In the steps S107E and S107F, both the radio apparatuses 10E and 10F change the operating radio channel of the forward link 12E to the new radio channel determined in the step S106. The operation in the step S107E may be started in response to the transmission of the change instruction in the step S106 or in response to lapse of a predetermined waiting time from the transmission of the change instruction. The operation in the step S107F may be started in response to the reception of the change instruction in the step S106 or in response to lapse of a predetermined waiting time from the reception of the change instruction. Then, the forward link 12E returns to the available state.

The steps S108, S109A, and S109B indicate a procedure for changing the operating radio channel of the forward link 124 in the downstream point-to-point radio system 1A. This procedure may be performed in a manner similar to the procedure (steps S106, S107E, and S107F) performed by the upstream point-to-point radio system 1E. Note that the steps S108, S109A, and S109B are not necessarily needed. As has been already described, the result of the channel search in the downstream point-to-point radio system 1A may be held in the point-to-point radio system 1A in order to use it when a failure occurs in the forward link 12A in the future, or may be sent to the OAM system (not shown in the diagram).

The procedure for switching the operating radio channel shown in FIG. 4 is merely an example. Those skilled in the art would easily understand that signaling and the control procedure for switching the operating radio channel can be modified in various ways. For example, although FIG. 4 shows the procedure for changing only the operating radio channel of the forward link (the forward link 12E), the operating radio channels of the forward link 12E and the reverse link 13E may be changed at the same time. Some modified examples are described in second and third embodiments below.

Second Embodiment

In this embodiment, a modified example of the control procedure described in the first embodiment is described. A configuration example of a point-to-point radio system according to this embodiment is the same as the one shown in FIG. 1.

Figure 5:
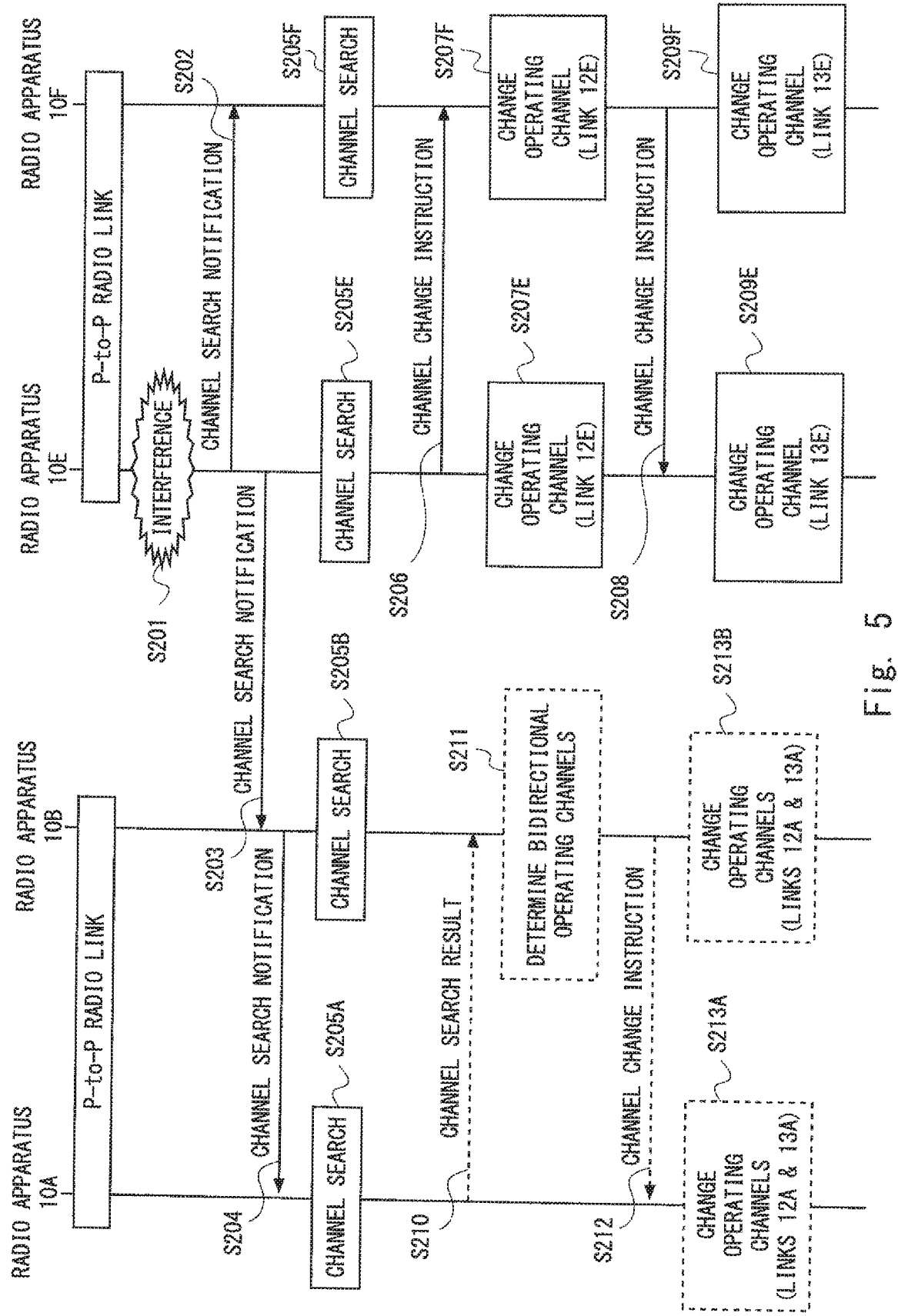
FIG. 5 is a sequence diagram showing an example of an execution procedure of channel searches in a mobile backhaul according to a second embodiment.

FIG. 5 is a sequence diagram showing an example of the control procedure including the channel searches and change of the operating radio channels. The example shown in FIG. 5 is modified from the example of FIG. 4 in that the channel searches and change of the operating radio channels are performed on the bidirectional radio links.

The processes in the steps S201 to S204 in FIG. 5 are similar to the processes in the steps S101 to S104 in FIG. 4, and thus the repeated description is omitted.

In the step S205A, the radio apparatus 10A performs the channel search for the forward link 12A. In the step S205B, the radio apparatus 10B performs the channel search for the reverse link 13A. In the step S205E, the radio apparatus 10E performs the channel search for the forward link 12E. In the step S205F, the radio apparatus 10F performs the channel search for the reverse link 13E.

The processes in the steps S206, S207E, and S207F in FIG. 5 are similar to the processes in the steps S106, S107E, and S107F in FIG. 4, and thus the repeated description is omitted.

The steps S208, S209E, and S209F indicate a procedure in the upstream point-to-point radio system 1E to change the operating radio channel of the reverse link 13E, The steps S208, S209E, and S209F may be performed if a radio channel exhibiting better reception quality than the current operating radio channel of the reverse link 13E is detected during the channel search in the step S205F. That is, in the step S208, the radio apparatus 10F determines a new radio channel to be used as the operating radio channel of the reverse link 13E based on the result of the channel search in the step S205F. Then, the radio apparatus 10F sends a channel change instruction to the radio apparatus 10E using the forward link 12E. This channel change instruction indicates the new operating radio channel of the reverse link 13E determined by the radio apparatus 10F. In the steps S209E and S209F, both the radio apparatuses 10E and 10F change the operating radio channel of the reverse link 13E to the new operating radio channel determined in the step S208.

The steps S210 to S212, 213A, and S213B indicate a procedure for changing the operating radio channels of the forward link 12A and the reverse link 13A in the downstream point-to-point radio system 1A. In the step S210, the radio apparatus 10A sends a result of the channel search for the forward link 12A (step S205A) to the radio apparatus 10B. In the step S211, the radio apparatus 10B determines new operating radio channels of the forward link 12A and the reverse link 13A based on the results of the channel searches for the forward link 12A and the reverse link 13A (steps S205A and S205B).

In the step S212, the radio apparatus 10B sends a channel change instruction to the radio apparatus 10A. This channel change instruction indicates the new operating radio channels of the links 12A and 13A determined in the step S211. In the steps S213A and S213B, both the radio apparatus 10A and 10B change the operating radio channels of the forward link 12A and the reverse link 13A to the new radio channels determined in the step S211.

In the change procedure shown in the steps S210 to S212, 213A, and S213B, the radio apparatus 103 determines the bidirectional operating radio channels. However, this may be changed as appropriate. For example, the radio apparatus 10A may determine the operating radio channel of the forward link 12A, and the radio apparatus 10B may determine the operating radio channel of the reverse link 13A. Moreover, the change procedure in the steps S210 to S212, S213A and S213B may not be performed.

Third Embodiment

In this embodiment, a modified example of the control procedure described in the first embodiment is described. A configuration example of a point-to-point radio system according to this embodiment is the same as the one shown in FIG. 1.

Figure 6:
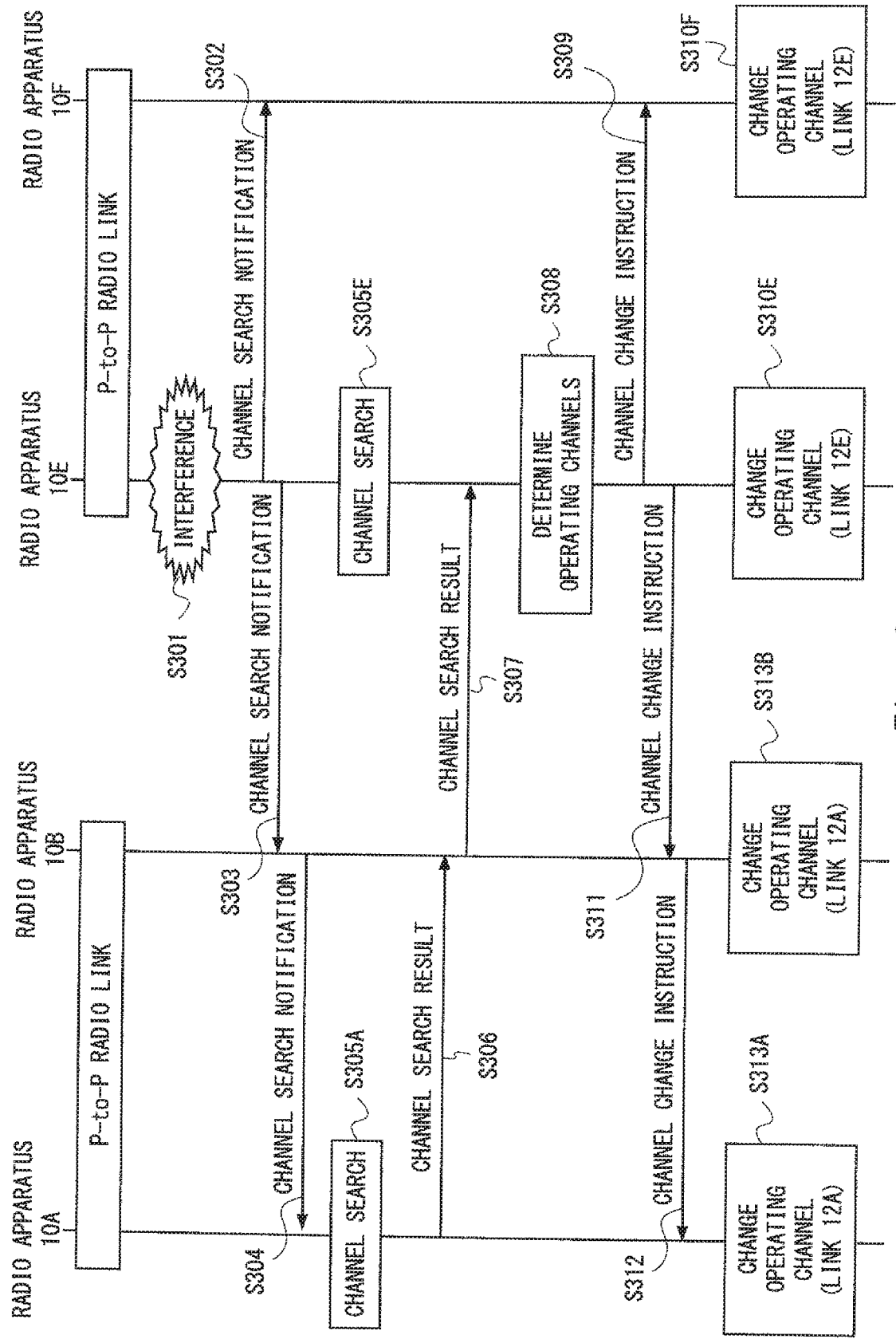
FIG. 6 is a sequence diagram showing an example of an execution procedure of channel searches in a mobile backhaul according to a third embodiment.

FIG. 6 is a sequence diagram showing an example of the control procedure including the channel searches and change of the operating radio channels. In the example shown in FIG. 6, each of the operating radio channel of the point-to-point radio system 1A and the operating radio channel of the point-to-point radio system 1E is determined based on results of the channel searches by both the two point-to-point radio systems 1A and 1E.

The processes in the steps S301 to S304, S305A, and S305E in FIG. 6 are similar to the processes in the steps S101 to S104, S105A, and S105E in FIG. 4, and thus the repeated description is omitted.

In the step S306, the radio apparatus 10A sends to the radio apparatus 10B a result of the channel search for the forward link 12A (step S305A). In the step S307, the radio apparatus 103 transfers, to the radio apparatus 10E, the received result of the channel search for the forward link 12A (step S305A). In the step S308, the radio apparatus 10E uses both the result of the channel search for the forward link 12A by the radio apparatus 10A and the result of the channel search for the forward link 12E by the radio apparatus 10E itself in order to determine each of the operating radio channels of the forward links 12A and 12E.

In an example, the radio apparatus 10E may determine the operating radio channels in such a way that different radio channels (radio frequency carriers) are used in the forward links 12A and 12E. This prevents mutual interference between the forward links 12A and 12E.

In another example, the radio apparatus 10E may determine each of the operating radio channels of the forward links 12A and 12E from among idle radio channels that exhibit favorable reception quality in both the channel searches for the forward links 12A and 12E. In other words, the radio apparatus 10E may determine each of the operating radio channels of the forward links 12A and 12E from among the Cartesian product (i.e., common part or intersection) between the set of idle radio channels obtained by the channel search for the forward link 12A and the set of idle radio channels obtained by the channel search for the forward link 12E. When the point-to-point radio system 1E is experiencing interference from another radio system on a certain radio channel, the point-to-point radio system 1A that is disposed close to the point-to-point radio system 1E may be susceptible to interference on this radio channel. According to the example described here, such radio channels that could cause interference can be excluded from the selection.

Referring again to FIG. 6 to continue the description, in the step S309, the radio apparatus 10E sends a channel change instruction to the radio apparatus 10F. This channel change instruction indicates the new operating radio channel of the forward link 12E determined in the step S308. In the steps S310E and S310F, both the radio apparatus 10E and 10F change the operating radio channel of the forward link 12E to the new radio channel determined in the step S308.

In the step S311, the radio apparatus 10E sends a channel change instruction to the radio apparatus 10B. This channel change instruction indicates the new operating radio channel of the forward link 12A determined in the step S308. In the step S312, the radio apparatus 10B transfers the channel change instruction received from the radio apparatus 10E to the radio apparatus 10A. In the steps S313A and S313B, both the radio apparatuses 10A and 10B change the operating radio channel of the forward link 12A to the new radio channel determined in the step S308.

The procedure shown in FIG. 6 is merely an example. For example, an entity that determines the operating radio channels of the forward links 12A and 12E may not be the radio apparatus 10F and may be another radio apparatus such as the radio apparatus 10A or 10B. In addition, an entity that determines the operating radio channels of the forward links 12A and 12E may be an OAM system (not shown in the diagram). In this case, the radio apparatuses 10A and 10E may send the result of the channel search for the forward link 12A and the result of the channel search for the forward link 12E, respectively, to the OAM system.

Other Embodiments

The above first to third embodiments may be combined with each other. For example, the second and third embodiments may be combined. To be more specific, the operating radio channels of the reverse links 13A and 13E may be determined using both the channel search result for the reverse link 13A by the radio apparatus 10B and the channel search result for the reverse link 13E by the radio apparatus 10F.

The above processes regarding the channel search and the operating radio channel change performed by the radio apparatuses 10A, 10B, 10C, 10D, 10E, and 10F may be implemented using a semiconductor processing device including an Application Specific Integrated Circuit (ASIC). Further, these processes may be implemented by causing a computer including at least one processor (e.g., a microprocessor, a Micro Processing Unit (MPU), a Central Processing Unit (CPU)) to execute a program. To be more specific, one or more programs containing a set of instructions for causing a computer system to perform algorithms described using sequence diagrams and the like in this specification may be created, and the program(s) may be supplied to the computer system.

The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program(s) to a computer via a wired communication line (e.g., electric wires, and optical fibers) or a wireless communication line.

The above embodiments are merely examples to which technical ideas achieved by the present inventors have been applied. These technical ideas are not limited to the above embodiments, and the above embodiments may be modified in various ways.

This application is based upon and claims the benefit of priority from Japanese Patent Application No. 2014-054547, filed on Mar. 18, 2014, the entire contents of which are hereby incorporated by reference.

REFERENCE SIGNS LIST

1A, 1C, 1E POINT-TO-POINT RADIO SYSTEM
5A, 5B BASE STATION
6 HIGHER NETWORK NODE
10A, 10B, 10C, 10D, 10E, 10F POINT-TO-POINT RADIO APPARATUS
11A, 11C, 11E POINT-TO-POINT RADIO LINK
12A, 12C, 12E FORWARD LINK
13A, 13C, 13E REVERSE LINK
20 PACKET COMMUNICATION DEVICE
101 RADIO INTERFACE
102 LAN INTERFACE
103 LAYER-2 SWITCH UNIT
104 CONTROLLER
1000 MOBILE BACKHAUL

What is claimed is:

1. A radio relay node for wireless relaying of data in a mobile backhaul between a base station and a core network, the radio relay node comprising:
   at least one processor; and
   at least one memory coupled to the at least one processor, the at least one memory storing instructions that, when executed by the at least one processor, cause the at least one processor to:
   connect, via a first radio link, to a first radio node at an upstream side towards the core network;
   connect, via a second radio link, to a second radio node at a downstream side towards the base station;

receive, from the first radio node, information indicating a radio link failure at a third radio link, the third radio link being at an upstream side from the first radio node; and send the information to the second radio node for recovery from the radio link failure.

2. The radio relay node according to claim 1, further comprising a plurality of radio transceivers.

3. The radio relay node according to claim 2, wherein each of the plurality of radio transceivers handles a plurality of radio channels.

4. The radio relay node according to claim 2, wherein each of the plurality of radio transceivers uses Frequency Division Duplexing (FDD) or Time Division Duplexing (TDD).

5. The radio relay node according to claim 2, wherein the plurality of radio transceivers are collocated.

6. A method of a radio relay node for wireless relaying of data in a mobile backhaul between a base station and a core network, the method comprising:

connecting, via a first radio link, to a first radio node at an upstream side towards the core network;

connecting, via a second radio link, to a second radio node at a downstream side towards the base station;

receiving, from the first radio node, information indicating a radio link failure at a third radio link, the third radio link being at an upstream side from the first radio node; and sending the information to the second radio node for recovery from the radio link failure.

7. The method according to claim 6, wherein the radio relay node comprises a plurality of radio transceivers.

8. The method according to claim 7, wherein each of the plurality of radio transceivers handles a plurality of radio channels.

9. The method according to claim 7, wherein each of the plurality of radio transceivers uses Frequency Division Duplexing (FDD) or Time Division Duplexing (TDD).

10. The method according to claim 7, wherein the plurality of radio transceivers are collocated.

* * * * *